United States Patent
Geddes et al.

(10) Patent No.: US 6,747,706 B1
(45) Date of Patent: Jun. 8, 2004

(54) WORKFLOW PROCESS FOR MANAGING DIGITAL BROADCAST PROGRAM PRODUCTION

(75) Inventors: Walt Geddes, Rockville, MD (US); Gene R. Griffin, Jr., Crofton, MD (US); Diana S. Wang, Potomac, MD (US); John M. Zetts, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/481,986

(22) Filed: Jan. 11, 2000

(51) Int. Cl.[7] .................. H04N 5/46; H04N 7/173
(52) U.S. Cl. .................. 348/722; 348/441; 725/93; 725/116
(58) Field of Search ................ 348/722, 441, 348/568, 575, 555; 725/138, 144–147, 91–93, 114–116, 135, 143; 705/7, 8, 10

(56) References Cited

U.S. PATENT DOCUMENTS

| | | | | |
|---|---|---|---|---|
| 4,689,683 A | * | 8/1987 | Efron | 348/722 |
| 5,001,473 A | * | 3/1991 | Ritter et al. | 340/825.52 |
| 5,036,395 A | * | 7/1991 | Reimers | 348/722 |
| 5,144,454 A | * | 9/1992 | Cury | 386/102 |
| 5,307,456 A | * | 4/1994 | MacKay | 345/782 |
| 5,311,423 A | * | 5/1994 | Clark | 705/8 |
| 5,537,157 A | * | 7/1996 | Washino et al. | 348/722 |
| 5,764,980 A | * | 6/1998 | Davis et al. | 707/104.1 |
| 5,768,375 A | * | 6/1998 | Yamauchi et al. | 725/33 |
| 5,852,435 A | * | 12/1998 | Vigneaux et al. | 345/428 |
| 5,880,792 A | * | 3/1999 | Ward et al. | 348/722 |
| 5,999,220 A | * | 12/1999 | Washino | 348/441 |
| 6,321,231 B1 | * | 11/2001 | Jebens et al. | 707/104 |
| 6,452,612 B1 | * | 9/2002 | Holtz et al. | 345/723 |

* cited by examiner

Primary Examiner—Michael H. Lee
Assistant Examiner—Paulos Natnael
(74) Attorney, Agent, or Firm—Sawyer Law Group LLP

(57) ABSTRACT

Aspects are described for addressing workflow processing to manage digital broadcast program development and production. A workflow processing aspect includes managing a plurality of production stages to produce a digital broadcast program, and managing storage of data among ingest, object, and program storage during the plurality of production stages to ensure efficiency of digital broadcast program development. The plurality of production stages include a sequence of an ingest stage, a triage stage, a program creation stage, and a program assembly stage. The data storage management includes managing encoding of data into MPEG-1 and MPEG-2 data files during the plurality of production stages.

4 Claims, 5 Drawing Sheets

WORKFLOW PROCESS FOR MANAGING DIGITAL BROADCAST PROGRAM PRODUCTION

RELATED APPLICATIONS

The present invention is related to co-pending U.S. Application, entitled SYSTEM FOR DIGITAL BROADCAST PROGRAM PRODUCTION, Ser. No. 09/480,402, filed on even date herewith, and assigned to the assignee of the present invention.

FIELD OF THE INVENTION

The present invention relates to digital broadcast program production, and more particularly to workflow processing for managing digital broadcast program production.

BACKGROUND OF THE INVENTION

The broadcast video industry is presently in the midst of a conversion from operating in the analog domain to the digital domain and more specifically, the compressed, digital domain. This conversion is sweeping and it affects all aspects of broadcast video from field acquisition and production to playout and transmission. Broadcasters have operated in the analog domain for nearly 50 years during which time they have developed production methodologies that have served them well. Although there is widespread agreement that there are substantial benefits inherent to digital video, there is a reluctance to convert to digital because the current methodologies do not necessarily translate well to digital methodologies.

Furthermore, broadcasters rightfully expect any digital solution to interact with existing applications such as Traffic & Scheduling and video editors. Reinforcing this reluctance to move to digital operations is the introduction and heavy reliance of computers and software applications in a workplace that has traditionally employed and trusted analog devices. Even though broadcast engineers use digital video to edit video and render special effects and graphics, the studio infrastructure has essentially remained analog.

Another equally important reason for broadcasters to delay converting to digital is the prohibitive costs associated with a highly reliable, 7×24 digital infrastructure. As an example, the traditional steel rack storing relatively cheap analog tapes gets replaced by an automated, robotic tape library costing $600,000. Although it provides substantial benefit, it is very expensive and it may be viewed as a single point of failure in the system.

Thus, although the need for full conversion to digital video production and broadcast system is recognized, universal acceptance remains problematic. Accordingly, what is needed is a streamlined approach to achieving digital video production and broadcast in an efficient manner. The present invention addresses such a need.

SUMMARY OF THE INVENTION

Aspects of the present invention address workflow processing to manage digital broadcast program development and production. Workflow processing includes managing a plurality of production stages to produce a digital broadcast program, and managing a plurality of data stores during the plurality of production stages to ensure efficiency of digital broadcast program development. The plurality of data stores include ingest storage for buffering newly ingested content, object storage for storing content during production and program storage for storing content upon completion of program assembly. The plurality of production stages include a sequence of a content ingest stage, a content triage stage, a program creation stage, and a program assembly stage. The data storage management includes managing encoding of data into MPEG-1 and MPEG-2 data files during the plurality of production stages.

Through the present invention, workflow processing within an infrastructure for digital broadcast program production uniquely provides end-to-end production of broadcast quality programming with integration of existing broadcast related applications. These and other advantages of the present invention will be more fully understood in conjunction with the following detailed description and accompanying drawings.

DETAILED DESCRIPTION

The present invention relates to digital video program production and broadcast. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention provides workflow processes and content management for a digital video program production and broadcast. In general, content management (CM) refers to the aspects of digital video and audio including: digital encoding and compression of analog video and audio captured from a variety of sources including production studios; cataloging and storing the digital assets and associated metadata into IBM's Digital Library (DL) database; capturing, cataloging and storing into DL content from the Internet (e.g., BMP, GIF, AVI, MP3); search and retrieval of all assets within DL; editing of assets using digital editors and subsequent updating of DL; workflow management; generation of e-mail to producers, editors, production assistants, technicians, etc., to trigger task execution; and tracking and reporting status of all tasks and work items.

Figure 1:
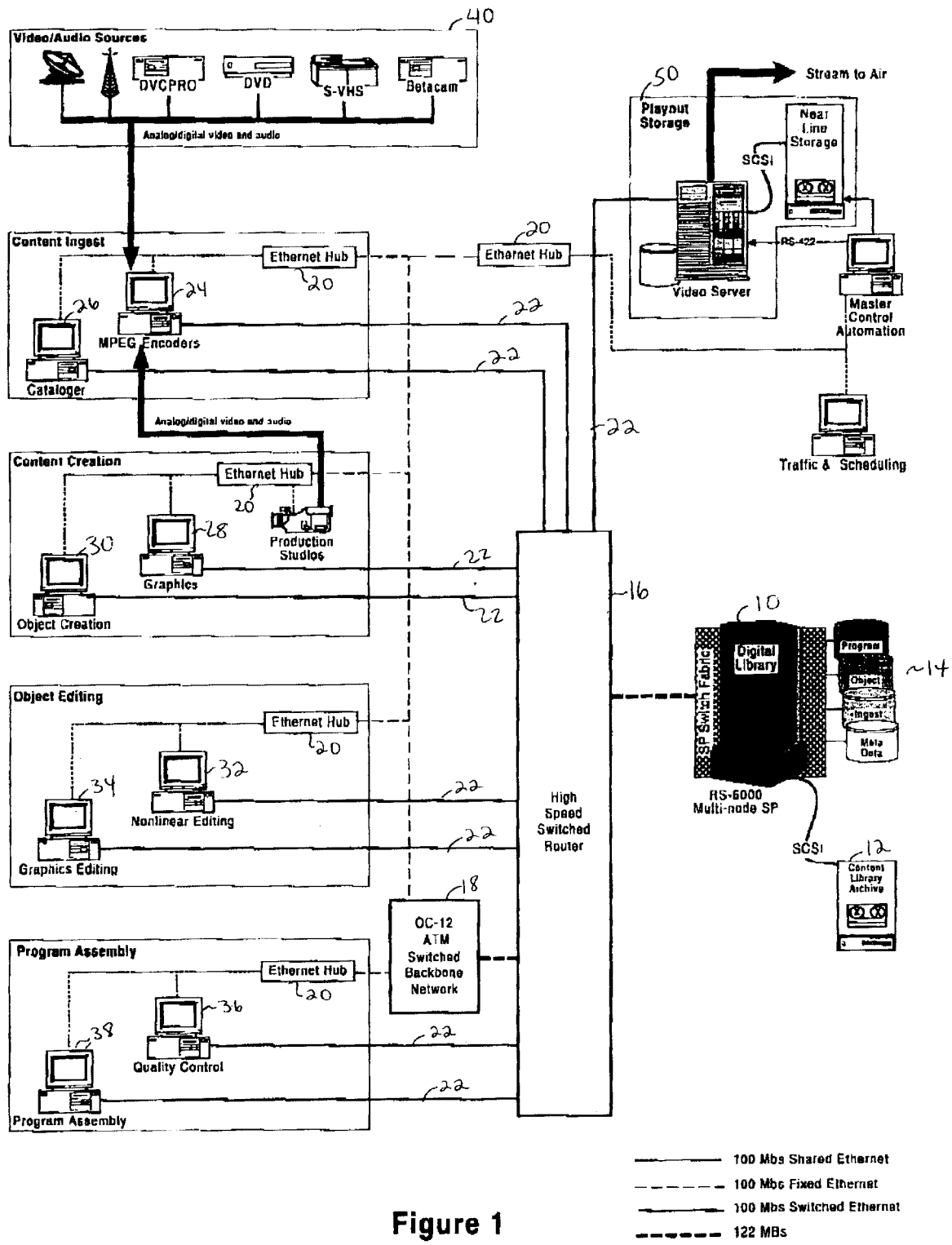
FIG. 1 illustrates a physical configuration of a system in accordance with the present invention.

Referring now to FIG. 1, a system in accordance with the present invention includes, as a central system, an 18 node RS-6000 SP cluster 10 (available from IBM Corporation Armonk, New York) upon which Digital Library and ADSM run. ADSM manages a robotic tape library 12 attached to the SP cluster 10 for near-line storage. Several SP nodes are dedicated to I/O for accessing up to 12 terabytes (TB) of DASD 14. Twelve TB of DASD 14 is equivalent to 1400 hrs. of high quality (18 Mbps), full motion video. The SP cluster 10 is accessed via an SP switched router 16, which is attached to a 622 Mbps switched ATM network 18. The ATM network 18 then fans out via 8265 switches into 100 Mbps Ethernet hub 20. The Ethernet networks are used for command and control and are considered low bandwidth. Fanning out directly from the SP switched router 16 are dedicated 100 Mbps switched Ethernet networks 22 that are private to individual workstations 24, 26, 28, 30, 32, 34, 36, and 38. By limiting the number of workstations on each Ethernet network to 1, very high bandwidth is guaranteed (~60 Mbps). These high speed connections are used to access the 18 Mbps MPEG-2 and 1 Mbps MPEG-1 video data via SP cluster 10. Preferably, the workstations 24, 26, 28, 30, 32, 34, 36, and 38 access SP storage directly using the Network File System (NFS), and the SP storage system is configured with the General Purpose File System (GPFS). GPFS employs striping to achieve high DASD I/O bandwidth, as is well understood by those skilled in the art. By significantly underloading what is essentially a file server, the SP cluster 10 actually serves as a streaming video server without the concomitant streaming support usually provided by the operating system. The direct access provided by NFS to DL digital assets substantially eliminates the need to transfer video files to the various workstations via FTP which improves productivity.

The bulk of the 12 TB of DASD in the SP cluster 10 is divided into 3 partitions: ingest, object and program storage. In general, in processing digital broadcast data, after encoding and compression, content is initially moved into ingest storage. Triage is then performed to discard unwanted content and parse the remaining content into relevant clips. The content is then moved into object storage. After a program has been built from objects in object storage, the rendered program is stored in program storage. The metadata is preferably stored separately from content.

The aspects, as described hereinbelow for the workflow processing in accordance with the present invention, utilize about 50–75 workstations that are dedicated to a variety of tasks including: MPEG-1/2 encoding; content cataloging; Web harvesting; language translations; graphic editors; video non-linear editors; audio editors; Web authoring; government regulators; quality control; workflow servers; Web servers; and Web browsers. By way of example, the following applications have been found to be suitable for the aspects of the present invention: Digital Library clients (IBM); Vela Encoding SW (available from Vela Research Lp); Islip Media (available from MediaSite Inc.) Logger and Finder clients; industry standard graphics, audio and video editors; Web harvesting tools; Web authoring tools; traffic and scheduling clients; Custom DL Object Search (IBM); Custom DL Object Logger (IBM); Newsflow (IBM); Studio Reservation System (IBM); and Language Translators. It should be appreciated that although specific types of software programs are referred to, they are meant as exemplary of preferred programming available for utilization in the present invention workflow processing. Of course, other programs that provide sufficiently equivalent capabilities may be utilized, as desired.

In general, source data that is received is processed in a series of stages. The stages include content ingest, content creation/triage, object editing, and program assembly, as presented in general below and in more detail with reference to FIGS. 2a, 2b, 3, 4, 5, and 6. Content Ingest Digital and analog video and audio is ingested from a plethora of sources 40, such as satellite broadcast, DVDs, video tape, CDs and DAT tapes. All analog video and audio is converted to Rec. 601 digital video and AES digital audio, as is well appreciated by those skilled in the art. As the content is ingested, it is compressed by the Vela encoders into MPEG-1 and MPEG-2 formats and stored as separate files in DL. Additionally, the content is processed by the Islip Media Logger which catalogs the video and generates metadata consisting of bitmaps of scene changes and descriptive text. The metadata, also stored in DL, is used to enhance search capability. The content ingest process also captures and logs content from the internet. In a production environment, several workstations are dedicated full time to ingesting and cataloging content.

Content Creation

Depending on the type and amount of content needed to produce the desired programming, content is also created in production studios and sound rooms. Production specialists create and/or modify content using industry standard graphic, video and audio editors. All newly created content is eventually cataloged and stored into DL.

Object Editing

The object editing portion of the workflow retrieves objects from DL and edits them as needed. Object editing is actually invoked during the ingest and content creation stages to cut unwanted content. This reduces the overall storage requirement and speeds up the process of searching and locating desired objects.

Program Assembly

Program assembly is the stage at which the program material is built using non-linear editors. Using well-known editing techniques, a timeline is created which produces an edit decision list (EDL). Note that no actual editing of the source material is performed. The producer builds the program by specifying the in and out points of each object downloaded from DL. When finished, the producer renders the program by commanding the editor to produce an MPEG-2 file. The editor builds this MPEG-2 file by executing the EDL. In accordance with the present invention, EDL is constructed using low bandwidth MPEG-1 files instead of the MPEG-2 files. This is achieved by frame accurate encoding of the MPEG-1 and MPEG-2 files. Although the low quality MPEG-1 files are used in the editing process, the program is rendered using the high quality MPEG-2 files.

Figure 2A:
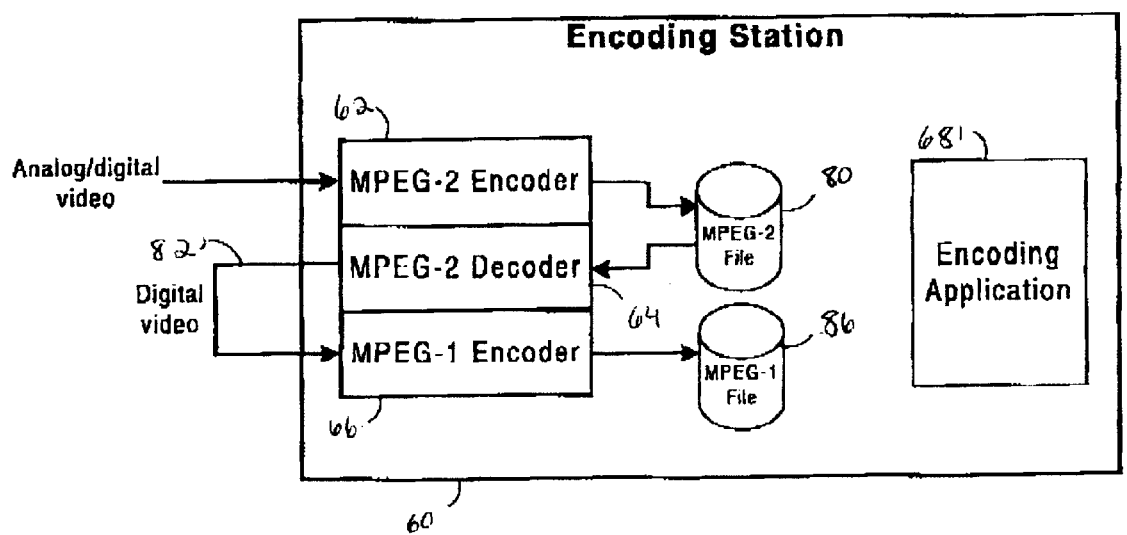
FIGS. 2a and 2b illustrate an MPEG-1/MPEG-2 encoding system and method in accordance with the present invention.
Figure 2B:
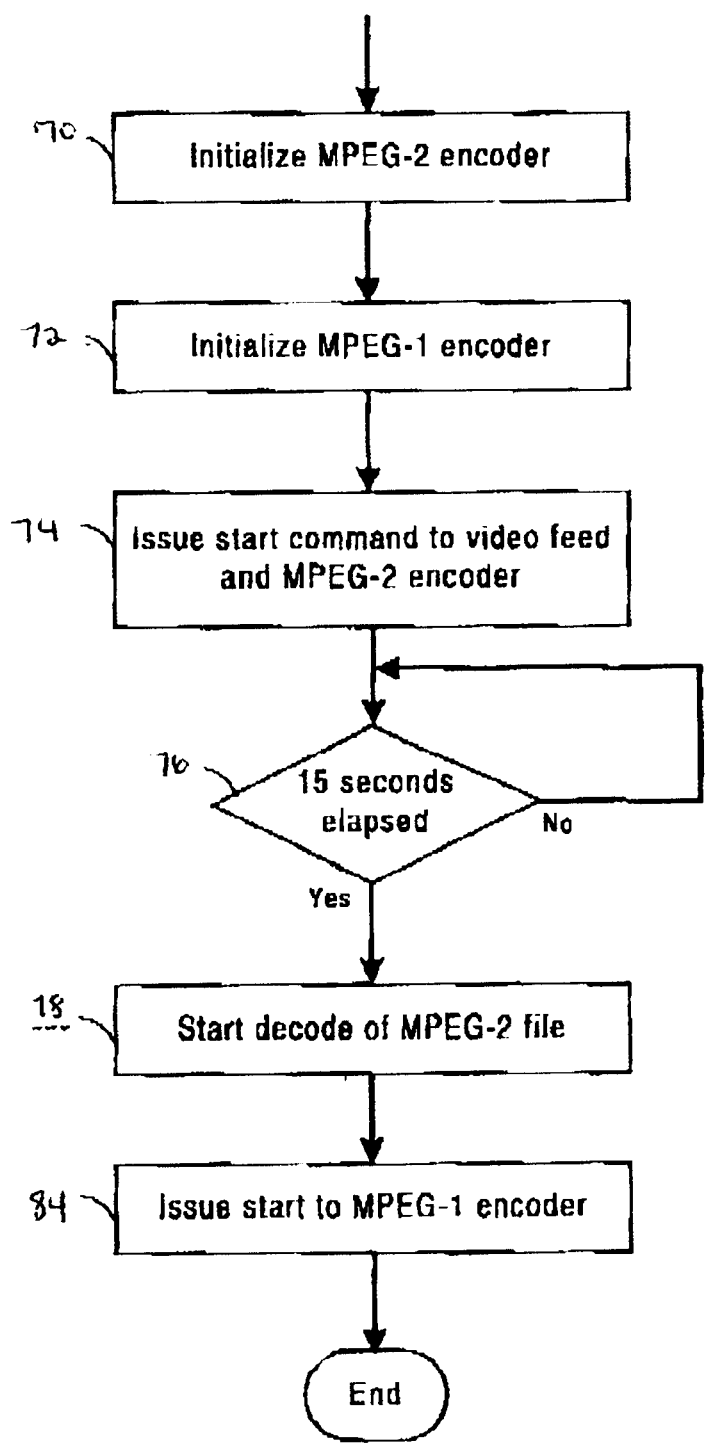

FIGS. 2a and 2b illustrate an encoding station and process for encoding, respectively, in accordance with the present invention. FIG. 2a illustrates the encoding station 60 comprising an MPEG-2 encoder 62, an MPEG-2 decoder 64, and an MPEG-1 encoder 66, as controlled by the concomitant encoding application 68. The logic flow of the encoding application 68, diagrammed in FIG. 2b, commences with the initialization of the MPEG-2 encoder 62 (step 70) and MPEG-1 encoder 66 (step 72). These operations set the format and length of the MPEG files. In step 74, the application issues a start command to both the video playout device and the MPEG-2 encoder 62 to start encoding video. A loop is then entered (step 76) to suspend further processing until 15 seconds has elapsed. When this condition has been satisfied, the loop falls through to step 78 to start the decoding of the MPEG-2 file 80, which is still being actively written by the MPEG-2 encoder 62. The MPEG-2 decoder 64 emits a digital video signal that is looped back (arrow 82) to serve as input to the MPEG-1 encoder 66. A start command is then issued to the MPEG-1 encoder (step 84) to start encoding the MPEG-1 file 86. In this manner, MPEG-1 and MPEG-2 files are created of equal duration and timecode.

Playout Storage

After the completed program has been approved, it is moved into playout storage 50 for safekeeping to guard against unauthorized modification and to make it available for immediate playout. Playout storage 50 is preferably a streaming broadcast video server configured with RAID storage. A robotic tape library is commonly attached to provide greater storage capacity. Both the video server and the tape library are traditionally controlled by master control automation for reliability and precision. The content is transferred from the SP cluster to the video server via FTP commanded by the playout transfer station.

Traffic and Scheduling

Traffic and Scheduling are mainframe applications that manage program scheduling and playout. These complex applications have been around for numerous years and broadcast operations rely very heavily on them, as is well known in the art. The digital solution of the present invention therefore integrates with Traffic and Scheduling.

NewsFlow

NewsFlow refers to a workflow program in accordance with the present invention that manages the end-to-end workflow process from content ingest to production to playout preparation, as described hereinbelow.

Content Ingest Workflow

Figures 3, 4:
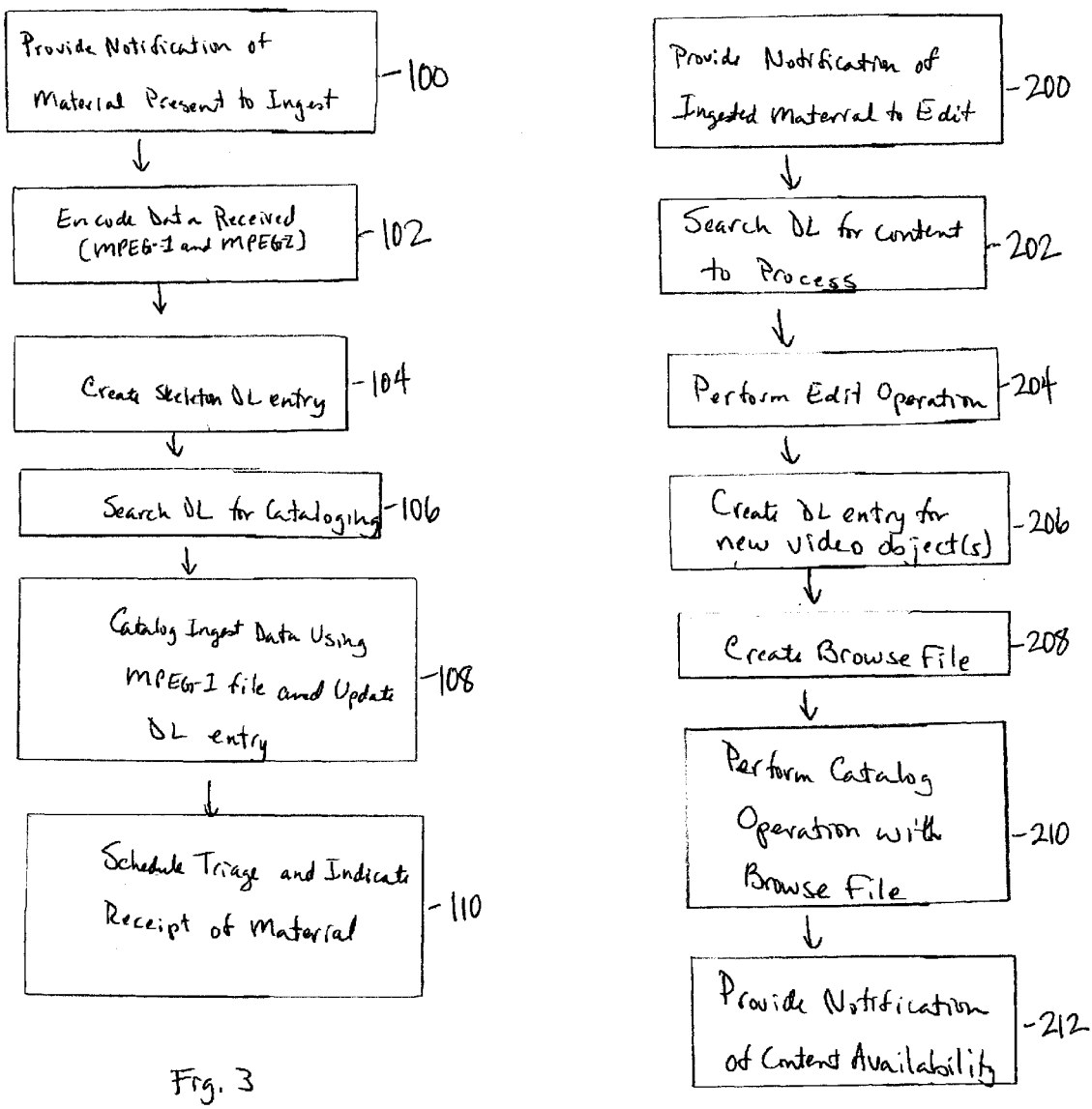
FIG. 3 illustrates a flow diagram for a workflow process associated with ingesting content in accordance with the present invention.
FIG. 4 illustrates a flow diagram for a workflow process associated with content triage in accordance with the present invention.

FIG. 3 depicts the workflow process for ingesting content. In step 100, technicians receive notification, such as via e-mail, of content targeted for ingestion.(satellite feeds, video/audio tapes, etc.). Electronic program guides are referenced to see what type of programming is scheduled to air that day to determine if it will contain content that is useful or currently in demand. Advancing to step 102, the analog or digital feeds are simultaneously encoded into MPEG-1 and MPEG-2 files and stored directly onto video store in the SP cluster. A skeleton entry is then made in DL (via step 104) with partial metadata to track the newly encoded material. E-mail may be generated at this time to trigger cataloging. A separate team of technicians responding to this e-mail or just searching for newly ingested content (via step 106) catalog the material and update the skeleton entry in DL with full metadata that includes thumbnail frames, closed caption text and further descriptive text and keywords entered by the technician (via step 108). The MPEG-1 file created in step 102 is used by the logger to catalog the material. Upon completion of ingest, NewsFlow is updated to schedule triage of the content (via step 110). If the Traffic and Scheduling system was awaiting receipt of the content, its status is also updated.

Content Triage Workflow

The workflow for content triage is illustrated in FIG. 4. Triage is normally performed by personnel with a high degree of awareness of the value and usability of content. They must also be familiar with copyright protection and rights management and be knowledgeable about the different sources and origins of the content. Upon receiving triage notification (via step 200), a search is performed to locate newly ingested material (via step 202) and using the Islip Media Finder application, the technician views the metadata and the scene shots to quickly ascertain the type and relative value of the content (step 204). The Finder allows the technician to view any portion of the video by streaming the MPEG-1 file. Using the video editor, the original MPEG-2 file may be parsed into one or more usable clips. For each new MPEG-2 clip, a skeleton entry must be logged into DL (via step 206) along with the appropriate metadata. The MPEG-2 file are then serially retrieved and decoded to create MPEG-1 browsing files (step 208). Once the MPEG-1 browsing files have been encoded, they are cataloged (via step 210) with full metadata to enhance search capability. In most cases, the original ingested material is then deleted from DL ingest storage. If the retained content happens to satisfy the immediate needs of any program producer, e-mail is generated (via step 212) via NewsFlow to inform the production team of its availability.

The end result of triage is that content is moved from ingest storage to object store at which time it is automatically backed up to an archive tape library. Moving content into object storage signifies that rights have been obtained or are in the process of being negotiated and all production teams are free to use it.

Program Creation Workflow

Figure 5:
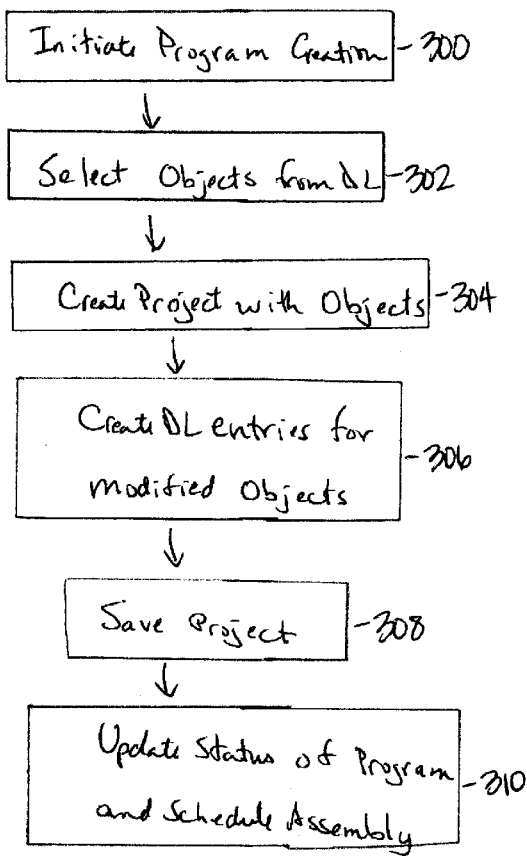
FIG. 5 illustrates a flow diagram for a workflow process associated with creating a program in accordance with the present invention.

FIG. 5 diagrams the process of creating a program from a plurality of DL objects. The process starts by accessing both NewsFlow and the Traffic & Scheduling system (via step 300) which contains program related information such as: plot script; parental rating; themes; storyboard pictures; targeted duration; commercial break times and lengths; still shots, graphic and voice over content; targeted language(s); scheduled air date; and production studio reservations. Armed with this information, a team of specialists search DL (via step 302) for graphic, video and audio objects to use in the program. All of these objects are moved down to the editing workstations, except for full motion video which is accessed as a network attached drive.

If work is just beginning on the program, a project is created (step 304). The project is a file that video editors use to track the EDL, object names and locations and other related data. The producer then starts the editing process. If a miscellaneous object such as a bitmap or audio track needs to be edited, the appropriate editing tool is instantiated, and the objects are modified, renamed and logged into DL (step 306) along with their metadata. At the end of the shift or workday, the project and EDL are saved in DL (step 308). Since the editing process involves no direct editing of existing objects, there is no need to store the objects back into DL, and the editing workstation is made available to the next shift. The following day, the producer can invoke the DL Object Search application (via step 302) to restore the workstation to its previous state (i.e., copy down the project, EDL and objects from DL) and resume creating the program for the project. As the program is built, the producer can generate e-mail (via step 310) to indicate progress, update status and task team members with work items.

Program Assembly Workflow

Figure 6:
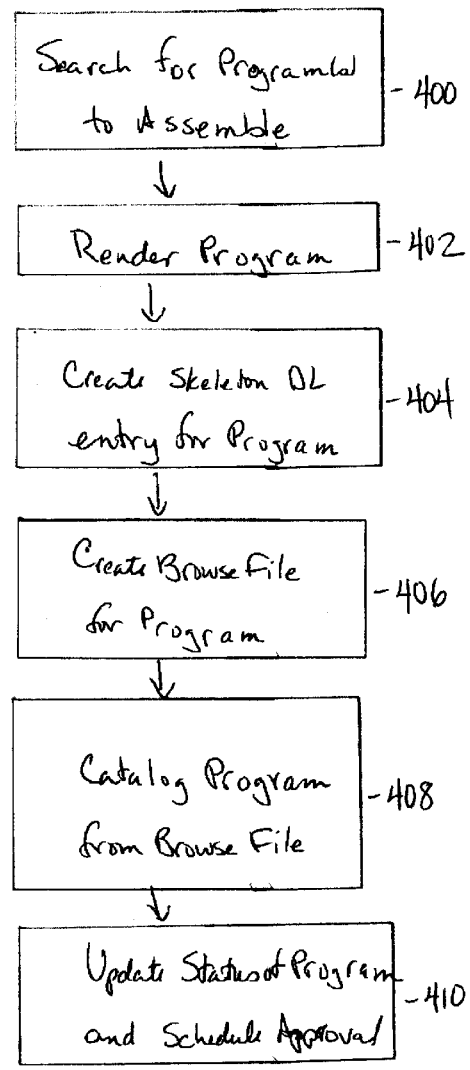
FIG. 6 illustrates a flow diagram for a workflow process associated with program assembly in accordance with the present invention.

Once the program has been completed, it is reassembled or rendered. In FIG. 6, the program's project and environment is again restored to the editing workstation (step 400). The EDL is then executed to render the program as an 18 Mbps IBP MPEG-2 transport stream file (step 402). The file is transferred near-real time to program storage using a block transfer FTP scheme for reliability. A new DL entry is created for the completed program (via step 404), and the MPEG-2 file is retrieved and decoded to create an MPEG-1 version for browsing (via step 406). Finally, the program is cataloged (via step 408), and NewsFlow and the Traffic & Scheduling system are updated. NewsFlow automatically e-mails Quality Control and other personnel with sign-off authority to schedule final inspection of the program (via step 410). After final sign-off, the program is moved to playout storage 50 (FIG. 1).

There are several databases for the various programs utilized in accordance with the present invention. For example, Traffic & Scheduling includes at least databases for programming, scheduling, and the tape library. Other databases include one for master control automation, tape archive library manager, still store and character generators, NewsFlow, Digital Library, and studio reservation system. In order to facilitate an efficient, reliable and user-friendly workflow, these applications must share database information, particularly that from DL, NewsFlow and Traffic & Scheduling. Built-in import/export features in these products and enhanced software invoking data import/export through XML provide capable support, so that end-users are not forced to enter data multiple times and constantly switch back and forth between the different user interfaces. Furthermore, in order to achieve a high degree of workflow automation, preferably, the sharing of data is automatic without requiring end-user or administrator interaction. These automatic database updates in turn trigger automatic changes in status, end-user notification and execution of internal tasks and subtasks.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for workflow processing for digital broadcast program production, the method comprising:

receiving multimedia production data from a plurality of broadcast data sources;

directing a plurality of stages that transform the multimedia production data into program data including directing a sequence of stages comprising an ingest stage, a triage stage, a program creation stage, and a program assembly stage; and directing translation of production data during the plurality of stages between MPEG-1 and MPEG-2 data formats, including encoding production data received according to both the MPEG-1 and MPEG-2 standards substantially simultaneously by utilizing production data received and encoded according to the MPEG-1 standard during the ingest stage and selecting MPEG-2 encoded data of the production data received based on MPEG-1 ingested data, parsing the selected MPEG-2 encoded data into at least one usable data clip, and creating a browsing file of MPEG-1 encoded data from the at least one usable data clip.

2. The method of claim 1 further comprising utilizing the browsing file for creating a program.

3. The method of claim 2 further comprising rendering the program created with MPEG-2 encoding and decoding the MPEG-2 encoded program into an MPEG-1 file.

4. The method of claim 3 further comprising cataloging the program rendered with the MPEG-1 file.

* * * * *